United States Patent
Drennen et al.

(10) Patent No.: US 6,626,270 B2
(45) Date of Patent: Sep. 30, 2003

(54) CALIPER WITH INTERNAL MOTOR

(75) Inventors: David B. Drennen, Bellbrook, OH (US); Ernest R. Siler, Springboro, OH (US); Gary C. Fulks, Dayton, OH (US); Douglas E. Poole, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/026,165

(22) Filed: Dec. 21, 2001

(65) Prior Publication Data

US 2003/0116388 A1 Jun. 26, 2003

(51) Int. Cl.$^7$ .............................................. F16D 55/08
(52) U.S. Cl. ...................................... 188/72.1; 188/157
(58) Field of Search ............................... 188/72.1, 72.6, 188/157, 156, 162, 161, 163, 164

(56) References Cited

U.S. PATENT DOCUMENTS

| | | | | |
|---|---|---|---|---|
| 4,540,066 A | * | 9/1985 | Evans | ........................ 188/72.6 |
| 5,178,237 A | * | 1/1993 | Ursel et al. | ................... 188/157 |
| 6,139,117 A | * | 10/2000 | Shirai et al. | ................ 188/72.1 |
| 6,367,592 B1 | * | 4/2002 | Kapaan et al. | ............. 188/72.1 |
| 6,367,593 B1 | * | 4/2002 | Siler et al. | .................. 188/72.1 |
| 6,412,610 B1 | * | 7/2002 | Drennen et al. | ............ 188/72.1 |

* cited by examiner

*Primary Examiner*—Christopher P. Schwartz
*Assistant Examiner*—Melanie Torres
(74) *Attorney, Agent, or Firm*—Scott A. McBain

(57) ABSTRACT

A brake caliper comprises a motor having a shaft, at least one first planetary gear, and at least one second planetary gear. The at least one first planetary gear is rotatably engaged with the shaft and with a piston, and is operatively engaged with a first carrier. The at least one second planetary gear is operatively engaged with the first stage carrier and with a second carrier. A ball screw is engaged with the second stage carrier for rotation therewith, and a ball screw nut is operatively engaged with the ball screw. A parking brake for the caliper is also provided.

14 Claims, 2 Drawing Sheets

CALIPER WITH INTERNAL MOTOR

TECHNICAL FIELD OF THE INVENTION

The present invention relates generally to brakes for motor vehicles, particularly to an electric caliper for a brake system in a motor vehicle.

BACKGROUND OF THE INVENTION

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the hydraulic fluid is eliminated. Instead, the application and release of the brake pad is controlled by an electric caliper.

Generally, the electric caliper includes a motor and a gear system. Typically, either a few large gears or many small gears for the gear system are needed to achieve the necessary load transfer. Also, the geometry of the motor influences its efficiency, since the preferred shape is long and thin. However, there is a limited amount of space available in the wheel for packaging the type of gears or motor necessary to obtain the same load transfer as in the hydraulic brake system. Therefore, space limitations constrain the use of an electric caliper in an automotive vehicle.

SUMMARY OF THE INVENTION

The present invention is a brake caliper comprising a motor having a shaft, at least one first planetary gear, and at least one second planetary gear. The at least one first planetary gear is rotatably engaged with the shaft and with a piston, and is operatively engaged with a first carrier. The at least one second planetary gear is operatively engaged with the first stage carrier and with a second carrier. A ball screw is engaged with the second stage carrier for rotation therewith, and a ball screw nut is operatively engaged with the ball screw. A parking brake for the caliper is also provided.

Accordingly, it is an object of the present invention to provide a caliper of the type described above with a large diameter piston and a shorter package length.

Another object of the present invention is to provide a caliper of the type described above including a motor that can be packaged inside of the ball screw.

Still another object of the present invention is to provide a caliper of the type described above in which the electronics are disposed at a distance from the rotor.

Still another object of the present invention is to provide a caliper of the type described above having a park brake feature.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
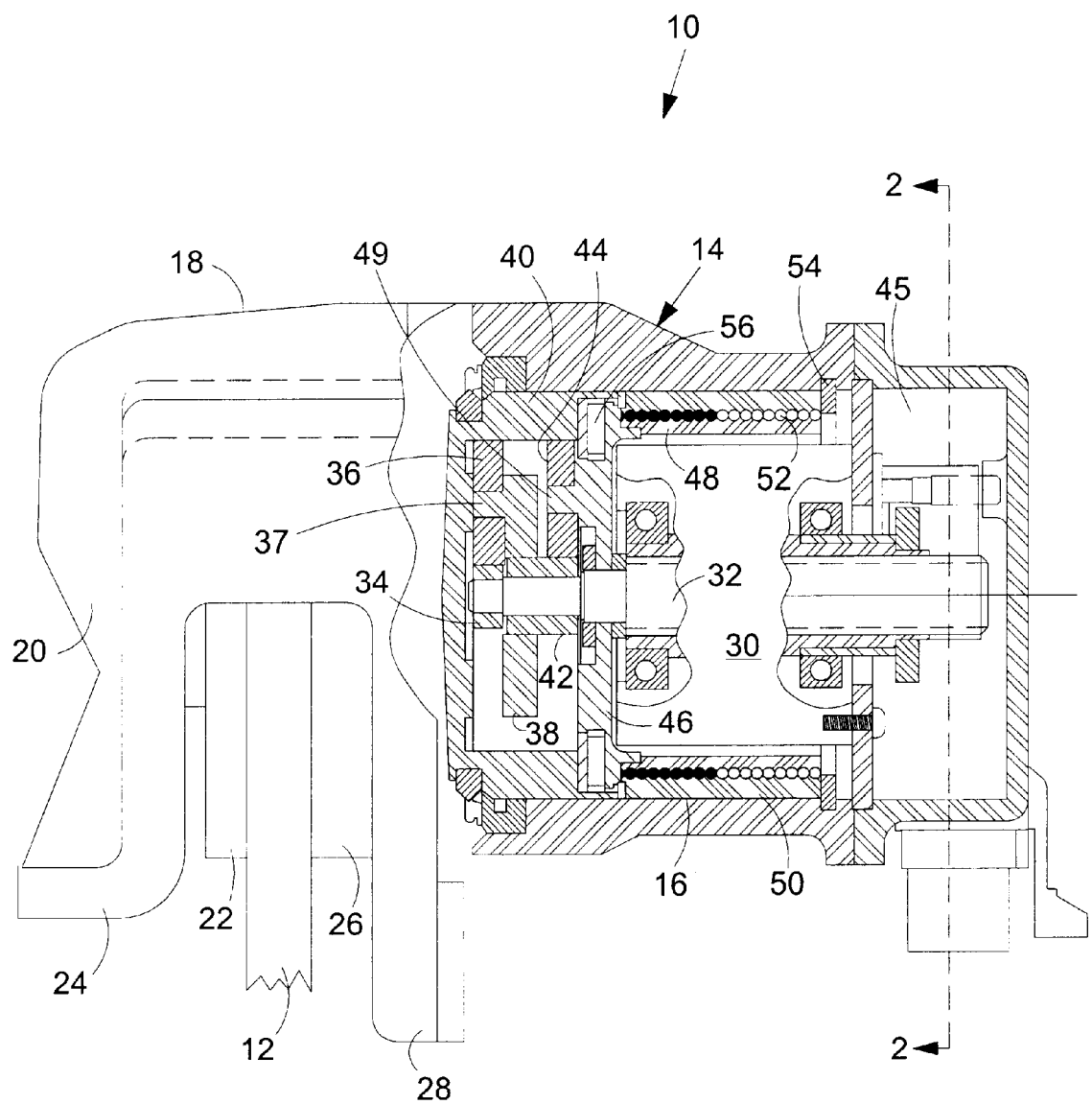
FIG. 1 is a cross-sectional view of an electric caliper according to the present invention.

FIG. 1 shows one embodiment of an electric caliper 10 according to the present invention for a brake system such as of the disc brake type to slow or stop rotation of a wheel (not shown) of a motor vehicle. The brake system includes a brake pedal (not shown) which communicates a signal from a driver of the motor vehicle to the electric caliper 10. Rotation of a disc or rotor 12 is retarded or stopped by engaging the electric caliper 10 which displaces a pair of resilient friction elements that engage the disc 12, as described below.

The electric caliper 10 includes a cylindrical housing 14 having a bore 16 and an L-shaped bridge 18 extending transversely from a front end of the housing 14. The bridge 18 has a leg 20 to move or displace an outer brake pad 22 as will be described. The electric caliper 10 also includes a conventional, generally U-shaped brake pad attachment bracket 24 positioned around the bridge 18 and operatively attached to the housing 14. For example, a conventional rod (not shown) interconnects the housing 14 and the attachment bracket 24 such that the housing 14 is transversely slidable along the rod, as will be described. It should be appreciated that the attachment bracket 24 is also fixedly attached to vehicle structure of the motor vehicle.

The electric caliper 10 also includes an inner brake pad 26 extending radially from an inner attachment bracket leg 28 closest to the housing 14. The disc 12 extends between the outer and inner brake pads 22 and 26. It should be appreciated that, in this example, the electric caliper 10 is of the floating type. During braking, the inner brake pad 26 engages the disc 12, and the resulting reactionary force pulls outer brake pad 22 into engagement with the disc.

A motor 30 is provided for controlling the engagement of the inner brake pad 26 and outer brake pad 22. The motor 30 is fixedly mounted within the bore 16 in the housing 14. The motor 30 includes an axially extending shaft 32 which drives a pinion gear 34. The pinion 34 in turn rotatably engages a plurality of first stage planetary gears 36. The planetary gears 36 are pinned on pins 37 to a first stage output gear 38, and travel about internal teeth on a piston 40 slidably disposed in the bore 16. The first stage output gear 38 is fixed to a bearing sleeve 42, which also rotates freely on the motor shaft 32. The bearing sleeve 42 includes a set of external teeth that mesh with a second set of planetary gears 44 that also engage the internal teeth of the piston 40. The planetary gears 44 are mounted on pins 49 extending axially from a second stage output plate 46.

In operation, a brake pedal is electrically connected to electronics 45 that control the electric caliper 10. The application of a force to the brake pedal initiates operation of the motor 30, which rotates the shaft 32, the pinion 34, and the first stage planetary gears 36. The planetary gears 36 correspondingly rotate the first stage output gear 38 and, through the bearing sleeve teeth and the secondary planetary gears 44, the second stage carrier 46. The second stage carrier 46, by splines, keys or any other suitable structure, in turn rotates a ball screw 48. The ball screw 48 operably engages a ball screw nut 50 to form a pathway or ball race in which rolling elements, such as spherical balls 52, may be disposed.

The ball screw nut 50 is driven into a retaining clip 54, or alternately into a flange on the housing 14, after which point the housing is driven to the right as shown in FIG. 1 to draw the outside brake pad 22 into the rotor 12. The resulting reactionary force drives the ball screw nut 50 into a thrust washer 56. The thrust washer in turn drives the piston 40, including the planetary gear train assembly and the motor assembly, into the inside brake pad 26, forcing the inside brake pad into the inside of the rotor 12 to create the required brake torque.

The present invention thus provides a caliper with a large diameter piston and a shorter package length. The caliper allows the motor 30 to be packaged inside of the ball screw 48, with the planetary gear train located outside of the ball screw. Because the planetary gear train is not confined to fit into the inside diameter of the ball screw, the gear train can be larger in diameter and shorter in overall length for increased gear ratio. Moreover, the location of the gear train close to the high temperatures generated at the rotor allows the electronics 45 to be mounted directly to the motor 30 and away from the rotor 12.

Figure 2:
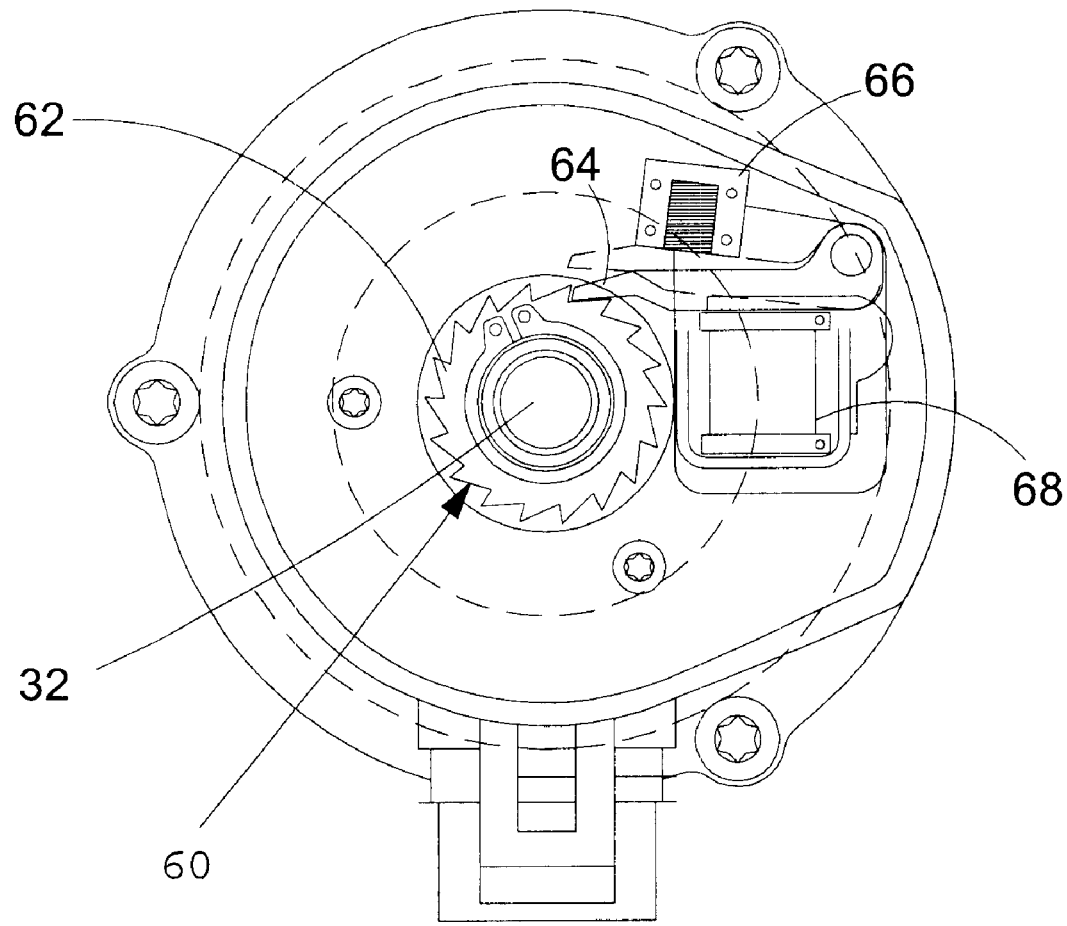
FIG. 2 is a cross-sectional view taken along line 2—2 in FIG. 1.

To apply a park brake, the motor shaft 32 actuates the brake pads as described above to the required park brake force. FIG. 2 shows the structure by which the caliper 10 retains and releases the park brake. An electromechanical brake pulley 60 is mounted on an opposite end of the motor shaft 32, and includes a plurality of teeth 62. A park brake lever 64 is held is an unapplied position by a torsional spring or, more preferably, by a magnet 66. As the motor continues to hold the required park brake force, a solenoid 68 is activated to overcome the retaining force of the magnet 66 and position the park brake lever 64 into engagement with one of the pulley teeth 62. The motor then releases power, which allows the pulley 60 to begin to rotate in the opposite direction and trap the park brake lever 64. The solenoid 68 can then be deenergized. To simplify the wiring connections, the solenoid 68 is preferably mounted directly on the base motor control circuit board located behind motor.

To release the park brake lever 64, the EMB motor is again energized to rotate the pulley 60. The park brake lever 64 rides up the profile of one of the teeth 62 until it is latched out of position by the magnet 66. Of course, the park brake lever 64 can be manually released by pulling a cable attached thereto. The present invention thus also provides a park brake feature that incorporates an apply force method that will latch and remain applied under no power condition.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A brake caliper comprising:
    a housing having a bore;
    a piston disposed in the bore;
    a motor having a shaft;
    at least one first planetary gear rotatably engaged with the shaft and with an inside diameter of the piston, the at least one first planetary gear being operatively engaged with a first stage carrier;
    at least one second planetary gear operatively engaged with the first stage carrier, the at least one second planetary gear being operatively engaged with a second stage carrier;
    a ball screw engaged with the second stage carrier for rotation therewith; and
    a ball screw nut operatively engaged with the ball screw.

2. The brake caliper of claim 1 wherein the at least one first planetary gear is rotatably mounted on a pin extending from the first carrier.

3. The brake caliper of claim 1 wherein the at least one second planetary gear is rotatably engaged with the first stage carrier.

4. The brake caliper of claim 1 wherein the at least one second planetary gear is rotatably engaged with an inside diameter of the piston.

5. The brake caliper of claim 1 wherein the at least one second planetary gear is rotatably mounted on a pin extending from the second stage carrier.

6. An electric brake caliper for a motor vehicle, the electric brake caliper comprising:
    a housing having a bore;
    a piston disposed in the bore;
    an electric motor having a shaft extending into the piston;
    at least one first planetary gear rotatably engaged with the shaft and with an inside diameter of the piston, the at least one first planetary gear being operatively engaged with a first stage carrier;
    at least one second planetary gear operatively engaged with the first stage carrier, the at least one second planetary gear being operatively engaged with a second stage carrier;
    a ball screw engaged with the second stage carrier for rotation therewith; and
    a ball screw nut operatively engaged with the ball screw.

7. The electric brake caliper of claim 6 wherein the at least one first planetary gear is rotatably mounted on a pin extending from the first carrier.

8. The electric brake caliper of claim 6 wherein the at least one second planetary gear is rotatably engaged with the first stage carrier.

9. The electric brake caliper of claim 6 wherein the at least one second planetary gear is rotatably engaged with an inside diameter of the piston.

10. The electric brake caliper of claim 6 wherein the at least one second planetary gear is rotatably mounted on a pin extending from the second stage carrier.

11. A parking brake for an electric caliper having a motor shaft, the electric caliper comprising:
    a pulley mounted proximate an end of the motor shaft, the pulley having a plurality of teeth;
    a park brake lever movable between an unapplied position and an applied position;
    a magnet for holding the park brake lever in the unapplied position; and
    a solenoid for moving the park brake lever to the applied position, the park brake lever in the applied position engaging the teeth of the pulley.

12. The parking brake of claim 11 wherein the park brake lever is pivotable about a fixed end.

13. A brake caliper comprising:
    a housing having a bore;
    a piston disposed in the bore;
    a motor having a shaft;
    at least one first planetary gear rotatably engaged with the shaft and with the piston, the at least one first planetary gear being operatively engaged with a first stage carrier;

at least one second planetary gear operatively engaged with the first stage carrier, the at least one second planetary gear being operatively engaged with a second stage carrier and rotatably engaged with an inside diameter of the piston;

a ball screw engaged with the second stage carrier for rotation therewith; and a ball screw nut operatively engaged with the ball screw.

14. An electric brake caliper for a motor vehicle, the electric brake caliper comprising:

a housing having a bore;

a piston disposed in the bore;

an electric motor having a shaft extending into the piston;

at least one first planetary gear rotatably engaged with the shaft and with the piston, the at least one first planetary gear being operatively engaged with a first stage carrier;

at least one second planetary gear operatively engaged with the first stage carrier, the at least one second planetary gear being operatively engaged with a second stage carrier and rotatably engaged with an inside diameter of the piston;

a ball screw engaged with the second stage carrier for rotation therewith; and a ball screw nut operatively engaged with the ball screw.

* * * * *

UNITED STATES PATENT AND TRADEMARK OFFICE
CERTIFICATE OF CORRECTION

PATENT NO. : 6,626,270 B2
DATED : September 30, 2003
INVENTOR(S) : Drennen, David et al.

It is certified that error appears in the above-identified patent and that said Letters Patent is hereby corrected as shown below:

Column 1,
Line 3, insert the following:
-- This Invention was made in the performance of a Cooperative Research and Development Agreement with the Department of the Air Force. The Government of the United States has certain rights to use the invention. --

Signed and Sealed this

Sixth Day of July, 2004

JON W. DUDAS
*Acting Director of the United States Patent and Trademark Office*